Oct. 23, 1951
A. C. MILLER
2,572,742
EMERGENCY BRAKE OPERATED SWITCH
Filed Nov. 12, 1948
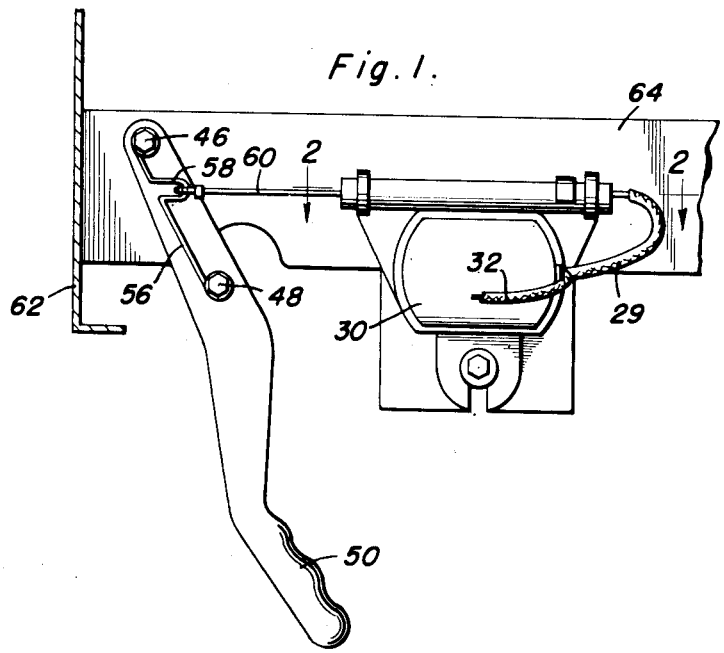
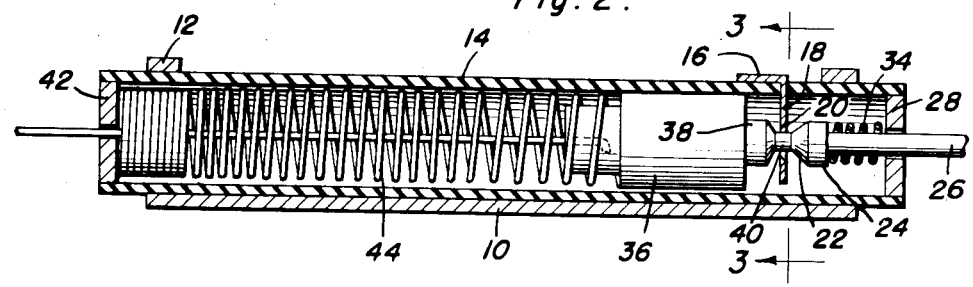
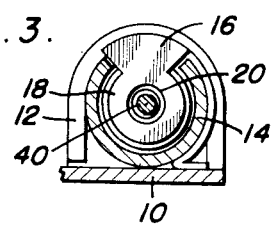
Archie C. Miller
*INVENTOR.*
BY *Clarence A. O'Brien
and Harvey B. Jacobson*
Attorneys Patented Oct. 23, 1951

2,572,742

UNITED STATES PATENT OFFICE 2,572,742

EMERGENCY BRAKE OPERATED SWITCH

Archie C. Miller, Ramsey, Ill.

Application November 12, 1948, Serial No. 59,536

1 Claim. (Cl. 200—59)

This invention relates to new and useful improvements in electrically operated signals and the primary object of the present invention is to provide an electrically operated signal connected to the circuit system of a vehicle and which is operated by the emergency brake lever of a vehicle to indicate to the driver that the emergency brake has been properly applied, thus preventing accidental movement of the vehicle and movement of the vehicle when the emergency brake has been applied.

Another important object of the present invention is to provide a device that will tend to prevent drivers from operating a vehicle while the emergency brake is applied and including a novel and improved switch that is actuated to a circuit closing position when the emergency brake lever of the vehicle has been moved to a braking position.

A further object of the present invention is to provide an emergency brake signal for indicating the braking position of a vehicle emergency brake that is quickly and readily applied to or removed from position relative to a vehicle dash board in convenient manner.

A still further aim of the present invention is to provide an emergency brake signal for vehicles that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary transverse vertical sectional view of a vehicle dash panel and showing the present invention applied thereto and to an emergency brake operating lever;

Figure 2 is an enlarged fragmentary longitudinal horizontal sectional view taken substantially on the plane of section line 2—2 of Figure 1;

Figure 3 is a transverse vertical sectional view taken substantially on the plane of section line 3—3 of Figure 2; and, Figure 4 is a perspective view of the means used in conjunction with the present invention for attaching the actuating cord to the emergency brake operating lever.

Referring now to the drawings in detail, wherein for the purpose of illustration, there is disclosed a preferred embodiment of the present invention, the numeral 10 represents a base member of any suitable material having a plurality of bendable tabs or hooks 12 that embrace and yieldingly retain a cylindrical insulating housing or guide 14 relative to the base member 10.

Suitably fixed to the housing 10 is one leg of an angulated grounding plate or member 16 having a free end portion 18 that is positioned within the housing 10 and which includes a beveled opening 20 that is adapted to receive the frustoconical end portion 22 of a plug or conductive member 24 that is secured to one end of a conductor or rod 26.

The rod 26 is slidably carried by a closure 28 at one end of the housing 10 and is electrically conected by wires 29 to an electrical, preferably sound signal 30, mounted on the base member 10 and which, in turn, is connected to the circuit wires 32 of a vehicle.

A coil spring 34 embraces the rod 26 and is biased between the plug 24 and closure 28 to normally urge the portion 22 into the aperture 20 to ground the wires 26 and sound the signal 30.

A cylindrical member 36 is slidably mounted in the housing 14 and includes a projection 38 having a reduced extension 40 that is adapted to extend through the opening 20 and bear against the portion 22.

Biased between a closure 42 at one end of the housing 14 and the member 36, is a coil spring 44 that normally urges the extension 40 against the portion 22 with the portion 22 spaced from the grounding plate.

Removably embracing the normally spaced bolts 46 and 48 of an emergency brake operating lever 50, are the terminal hooks 52 and 54 of an elongated wire member 56 having a loop or recess 58 adjacent its end portions that removably engages one end of an actuating cord or rod 60.

The rod 60 is slidably carried by the closure 42 and the free end thereof is suitably secured to the member 36.

The base member 10 is suitably secured to a portion of the vehicle adjacent the dash board 62 or to the support 64 for the lever 50.

In practical use of the present invention, the spring 44 normally urges the extension 40 against the portion 22 to space the latter from the grounding plate and the signal 30 is not energized.

When the lever 50 is moved to a braking position, and the vehicle motor is running, the member 36 will be moved so that the portion 22 bears against the free leg portion 18 of the grounding plate 16 thus sounding the signal 30 to indicate to the driver that the emergency brake has been applied.

As the ignition switch (not shown) is turned off the signal will be de-energized until the ignition switch is again activated to an "on" position.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A switch for indicating when the emergency brake of a vehicle has been applied, said switch comprising a base member, an elongated cylindrical housing mounted on said base member and including first and second end walls, said housing having a transverse slot therein adjacent said first end wall, an angulated grounding plate including first and second portions, the first portion of said plate being fixed to said housing and the second portion of said plate being received in said slot and having a central opening, a conductive member slidably carried by the first end wall, a spring urging said conductive member toward said grounding plate, a cylindrical member slidably mounted in said housing and disposed between said grounding plate and the second end wall, said cylindrical member having a reduced extension slidably received in the opening in said grounding plate, an operating cord secured to said cylindrical member and slidably carried by the second end wall, and a further spring urging the cylindrical member toward the grounding plate and the reduced extension through the opening in said grounding plate and against the conductive member to space the conductive member from the grounding plate until the cord is pulled to move the cylindrical member away from the grounding plate.

ARCHIE C. MILLER.

REFERENCES CITED

The following references are of record in the file of this patent:

UNITED STATES PATENTS

| Number | Name | Date |
|---|---|---|
| 1,068,600 | McWilliams | July 29, 1913 |
| 1,375,329 | Shaff | Apr. 19, 1921 |
| 2,255,381 | Ellery | Sept. 9, 1941 |
| 2,274,870 | Richards | Mar. 3, 1942 |
| 2,305,983 | Muth | Dec. 22, 1942 |
| 2,483,358 | Allen | Sept. 27, 1949 |

FOREIGN PATENTS

| Number | Country | Date |
|---|---|---|
| 98,463 | Austria | June 15, 1924 |